United States Patent
Rollier

(10) Patent No.: US 10,301,089 B2
(45) Date of Patent: May 28, 2019

(54) CABLE TIE

(71) Applicant: SES-STERLING INDUSTRIE-HOLDING AG, Mariastein (CH)

(72) Inventor: Daniel Rollier, Muttenz (CH)

(73) Assignee: SES-STERLING SA, Saint-Louis (FR)

( * ) Notice: Subject to any disclaimer, the term of this patent is extended or adjusted under 35 U.S.C. 154(b) by 0 days.

(21) Appl. No.: 15/486,658

(22) Filed: Apr. 13, 2017

(65) Prior Publication Data
US 2017/0297794 A1    Oct. 19, 2017

(30) Foreign Application Priority Data
Apr. 15, 2016 (FR) ...................... 16 53365

(51) Int. Cl.
*B65D 69/00* (2006.01)
*F16B 1/02* (2006.01)
*B65D 63/10* (2006.01)

(52) U.S. Cl.
CPC ......... *B65D 69/00* (2013.01); *B65D 63/1027* (2013.01); *B65D 63/1072* (2013.01); *F16B 1/02* (2013.01)

(58) Field of Classification Search
CPC ................ B65D 69/00; B65D 63/1072; B65D 63/1063; F16B 1/02; Y10T 24/1498; Y10T 24/141; F16L 3/2334
See application file for complete search history.

(56) References Cited

U.S. PATENT DOCUMENTS

| 4,287,644 A * | 9/1981 | Durand | F16L 3/2334 |
| | | | 24/16 PB |
| 5,911,367 A * | 6/1999 | McInerney | B65D 63/1072 |
| | | | 24/16 PB |
| 6,578,239 B2 * | 6/2003 | Hatch | B65D 63/1027 |
| | | | 24/16 PB |

(Continued)

FOREIGN PATENT DOCUMENTS

| EP | 1 818 275 A1 | 8/2007 |
| FR | 1 168 600 | 12/1958 |
| WO | 2009/001079 A1 | 12/2008 |

OTHER PUBLICATIONS

French Search Report Corresponding to 16/53365 dated Nov. 21, 2016.

*Primary Examiner* — Robert Sandy
*Assistant Examiner* — Rowland Do
(74) *Attorney, Agent, or Firm* — Davis & Bujold PLLC; Michael J. Bujold

(57) ABSTRACT

A cable tie (1) having a material strip (11), a fastening head (2) that has a first opening (30) provided with a ratchet (34) and protrudes with respect to the longitudinal axis of material strip (11), an insertion element (15) arranged to be introduced in the fastening head (2), first opening (30) passing longitudinally through the fastening head (2) between an entry (31), at a free end of fastening head (2), and an exit (32), ending towards a junction area (16) between material strip (11) and fastening head (2). The fastening head (2) has a second opening (40) that passes transversely therethrough and arranged between junction area (16) and the first opening (30) so that, during a tying position of the cable tie (1), the exit (32) of first opening (30) ends inside of the loop and faces towards second opening (40).

14 Claims, 6 Drawing Sheets

(56) References Cited

U.S. PATENT DOCUMENTS

| | | | |
|---|---|---|---|
| 7,356,885 B2* | 4/2008 | Tomasetti | B65D 63/1072 24/16 PB |
| 8,578,565 B2* | 11/2013 | Hienekamp | B65D 63/1072 24/16 PB |
| 2002/0083559 A1 | 7/2002 | Hatch | |
| 2007/0266531 A1* | 11/2007 | Krisel | B65D 63/1072 24/16 PB |
| 2009/0113675 A1* | 5/2009 | Saltenberger | B65D 63/1072 24/16 PB |

* cited by examiner

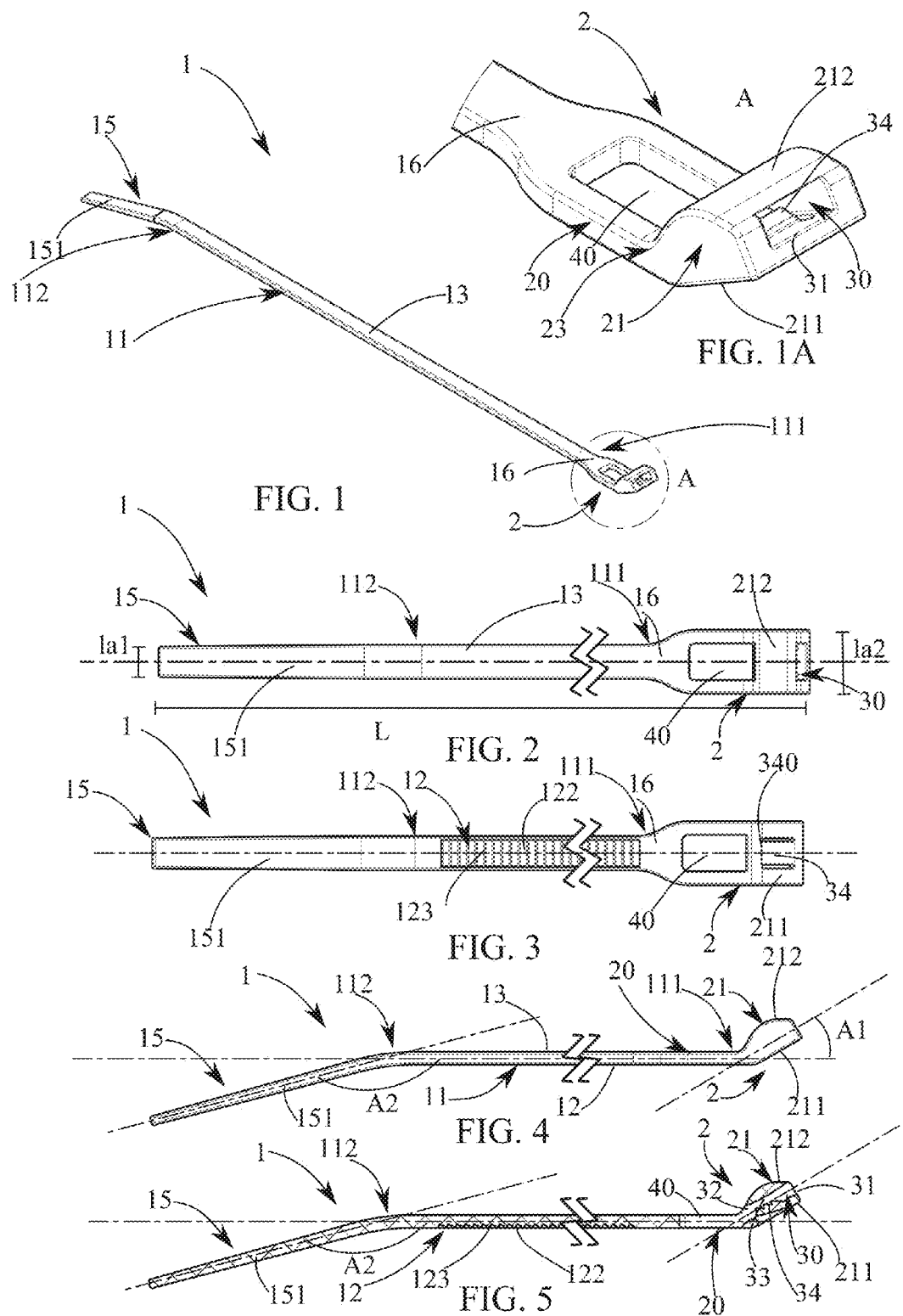

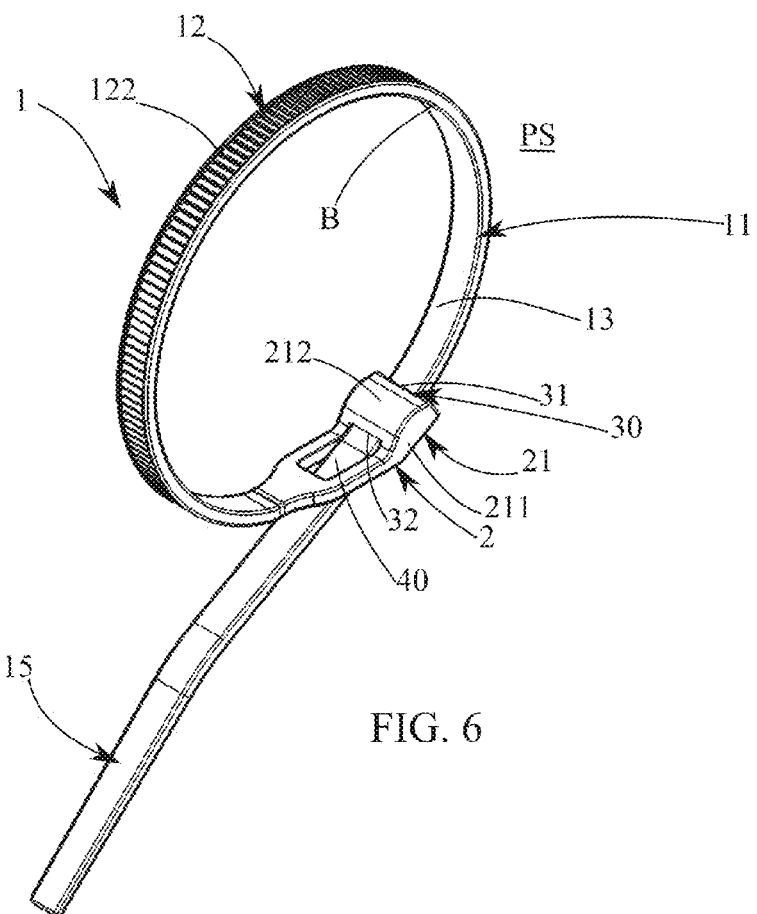
FIG. 6
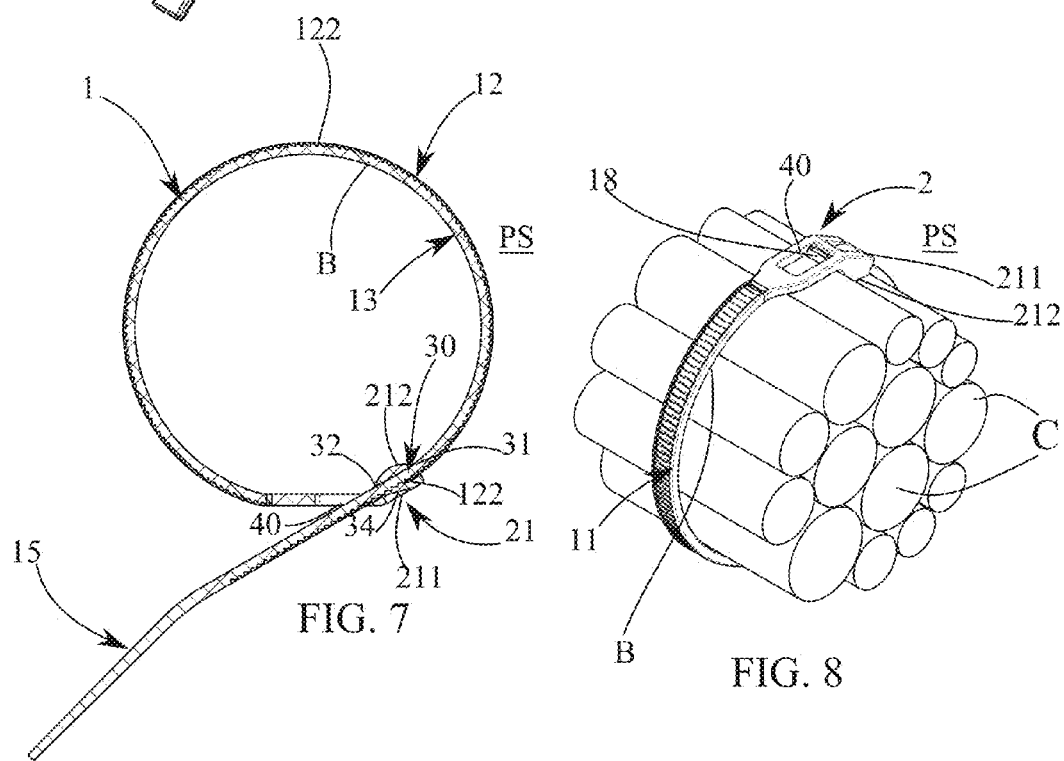
FIG. 7
FIG. 8

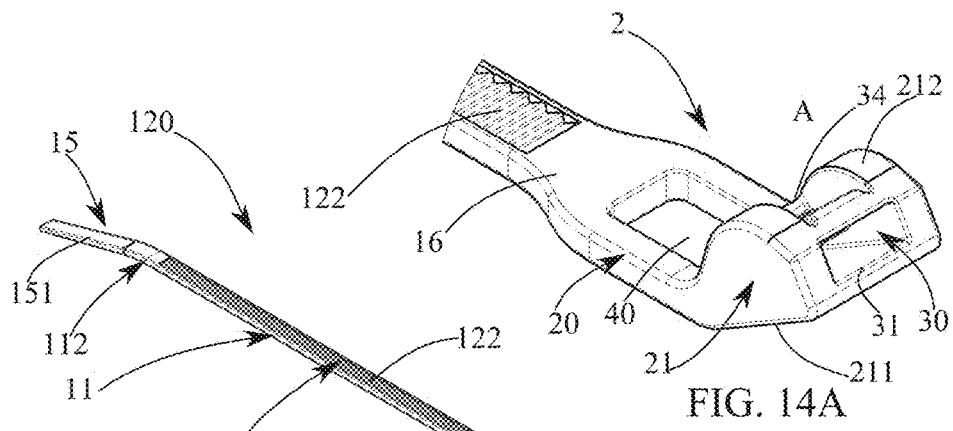
FIG. 14
FIG. 14A
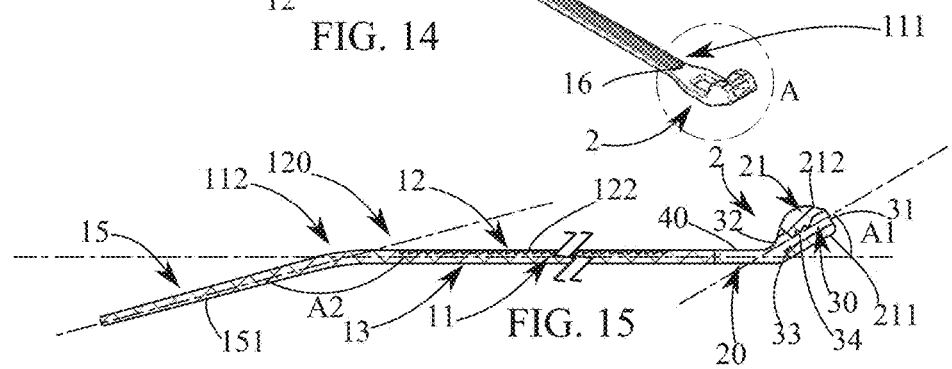
FIG. 15
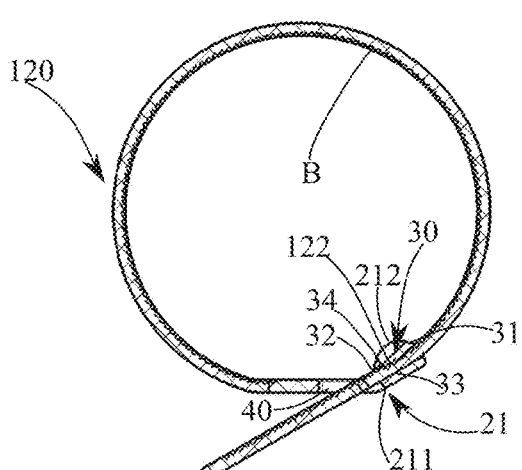
FIG. 16
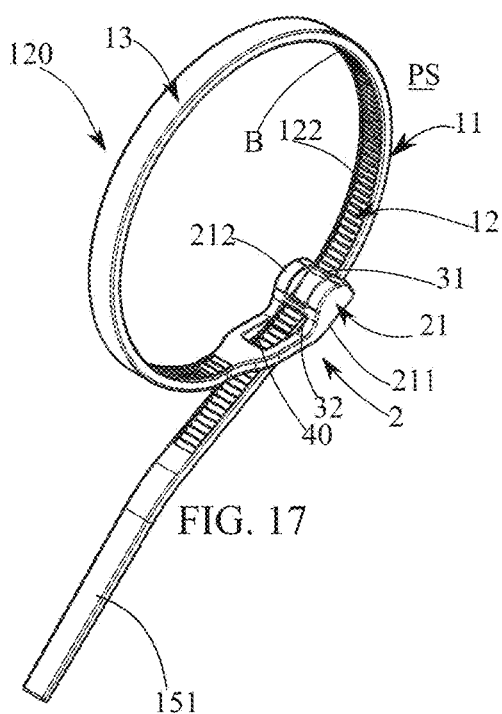
FIG. 17

CABLE TIE

This application claims priority from French patent application serial no. 16/53365 filed Apr. 15, 2016.

FIELD OF THE INVENTION

The present invention relates to a cable tie including an elongate flexible material strip provided with a first side and a second side, which are opposite, said first side comprising a notched section, said cable tie comprising at a first end of the material strip a fastening head comprising a first opening provided with a ratchet and which protrudes with respect to the longitudinal axis of the material strip, and at a second end of the material strip an insertion element that is free and arranged to be introduced in said fastening head, the first opening passing longitudinally through said fastening head between an entry ending at a free end of the fastening head and an exit ending towards a junction area between the material strip and the fastening head, cable tie wherein, in a tying position of said cable tie, said material strip passes through the first opening of the fastening head from said entry towards said exit so that the material strip forms a closed loop, and the notched section of the first side of the material strip cooperates with the ratchet of the fastening head to allow movement of the notched section with respect to the first opening in a single direction and prevent its movement in an opposite direction, said fastening head comprising moreover a second opening that passes through it transversally, arranged between the junction area and the first opening, so that, in the tying position of said cable tie, the exit of the first opening ends inside of the loop and towards the second opening.

BACKGROUND OF THE INVENTION

Cable ties used to tie together a cable harness and which have the characteristic to be self-locking are already known. Such cable ties generally have the shape of a flexible material strip, most often out of plastic, which comprises at a first end a fastening head provided with one single opening that can be longitudinal or transversal and allows receiving a second end of the material strip, which is free. The material strip is notched on one of its sides or on both sides and the opening of the fastening head comprises a ratchet. From this results that, when the second end of the material strip is inserted in the opening of the fastening head, the material strip is closed in the form of a loop, and at least one of the notches of the notched side of the material strip and the ratchet engage to lock the cable tie. Consequently, the movement of the material strip with respect to the opening of the fastening head is only allowed in one direction. In fact, when one pulls the second end of the material strip, the loop formed shrinks and it is no longer possible to enlarge the loop. This type of tie is therefore particularly interesting to tie a cable harness. However, when the loop is closed, the fastening head of the cable tie protrudes outside of the loop, and the second end of the material strip must protrude outside of the loop to facilitate the adjustment of the size of the loop by pulling the second end of the strip. This is why the opening of the fastening head ends outside of the loop. Most of the time, when the cable harness is tied, the second end and the corresponding part of the material strip that protrudes outside of the loop are cut off to reduce the space requirement of the cable tie. Nevertheless, the fastening head remains protruding outside of the loop and, in certain conditions, its presence is problematic. In particular, such as when there are several cable harnesses, where the protruding fastening heads can damage the neighboring cables by crushing the insulations. Publications WO 2009/001079 A1 and EP 1 818 275 A1 illustrate this type of cable tie provided with one single opening passing through the fastening head in the longitudinal direction of the material strip.

Publication EP 1 818 275 A1 describes a cable tie whose fastening head is flat in the extension of the material strip and comprises two transversal slots parallel to each other in which the free end of the material strip is introduced successively, thus avoiding any overthickness outside of the loop in its tying position. However, the implementation of this solution is difficult and time-consuming, as it requires, to close the cable tie in a loop around a cable harness, to introduce the free end of the material strip first in the first slot from the outside towards the inside of the harness, then in the second slot, from the inside towards the outside of the harness.

Publication US 2002/083559 A1 corresponds to the preamble of the independent claim and discloses a cable tie in which the fastening head comprises a first opening that passes through the head in the longitudinal direction, followed by a second opening that passes through the head in the transversal direction and comprising obligatorily an inclined ramp that allows deviating the free end of the material strip towards the outside of the loop when the cable tie is closed in a loop. Therefore, the structure of this cable tie type is complex and does not necessarily guarantee the exit of the free end towards the outside, depending on the diameter of the loop.

For these reasons, the solutions of the prior art are not satisfying.

SUMMARY OF THE INVENTION

The present invention aims to overcome these disadvantages by offering a cable tie with a simplified structure and optimized space requirement, so that the fastening head shows a reduced space requirement outside of the loop in the tying position while ensuring the guidance of the free end of the material strip towards the outside of the loop when the cable tie is closed in a loop, regardless of the diameter of the loop.

To that purpose, the invention relates to a cable tie of the kind described in the preamble, characterized in that said fastening head comprises a section protruding with respect to the longitudinal axis of the material strip, oriented towards one of the first or second sides of the material strip, and in which the first opening is arranged, said protruding section is inclined by an acute angle with respect to the longitudinal axis of the material strip, and said first opening comprises an internal wall inclined by the same angle forming a guide channel arranged for guiding the material strip through said second opening towards the outside of the loop.

Adding a second opening allows designing a cable tie with a fastening head that protrudes mainly inside of the loop in the tying position. In fact, the second opening allows passing the free end of the material strip from the inside of the loop to the outside of the loop in the tying position. Moreover, the inclination angle given to the protruding section of the fastening head, and consequently to the first opening, allows guiding naturally and automatically the free end through the second opening towards the outside of the loop.

The exit of the first opening ends preferably in the second opening.

The protruding section of the fastening head can comprise a first inclined external wall located on the side of one of the first or second sides so that, in the tying position, the first external wall can be located outside of the loop and substantially fit the shape of the loop.

In this case, the protruding section of the fastening head can comprise a second external wall opposite to the first external wall, oriented towards the other of the first and second sides of the material strip so that, in the tying position, the second external wall can protrude inside of the loop.

In a preferred embodiment, the internal wall of the first opening comprises said ratchet.

The fastening head comprises advantageously a flat section located between the junction area and the protruding section, in the plane of the material strip, and wherein the second opening is arranged.

Said insertion element advantageously comprises an inclined section, which is inclined by an obtuse angle with respect to the longitudinal axis of the material strip and oriented towards the first side or the second side opposite to the first side of the material strip.

The first opening forming the guide channel is preferably a rectilinear channel.

According to an embodiment of the invention, the ratchet is arranged on the side of the first external wall of the protruding section, and the protruding section of the fastening head comprises a longitudinal slot that extends on the second external wall, is centered with respect to the first opening, opens the first opening longitudinally and ends with an outlet in the first opening. In this case, said insertion element preferably shows a reduced width with respect to the width of the material strip, the width of said insertion element being smaller than or equal to the width of the slot to allow its introduction in the first opening of the fastening head through said slot.

The first opening can be provided, on its internal wall, with two overthicknesses located on either side of said slot outlet and forming two grooves.

And the material strip can comprise two lips that extend along the edges of the material strip to cooperate with the two grooves of the first opening in the tying position.

In a preferred embodiment, the second side of the material strip is a flat face. According to another embodiment variant, the second side of the material strip can comprise a notched section arranged to cooperate with a second ratchet arranged on the external wall of the first opening in front of the first ratchet.

The ratchet can advantageously be arranged on the side of the first external wall of the protruding section so as to offer at a free end of said ratchet an insertion space allowing dismounting said cable tie.

In the tying position, a cut end of the material strip obtained after cutting off can be advantageously housed in the second opening in order not to protrude outside of the loop.

BRIEF DESCRIPTION OF THE DRAWINGS

The present invention and its advantages will be better revealed in the following description of several embodiments given as non limiting examples, in reference to the drawings in appendix, in which:

FIG. 1 represents a perspective view of a cable tie according to a first embodiment variant of the invention, FIG. 1A is a perspective view of detail A of FIG. 1 showing the fastening head of the cable tie, FIG. 2 is a top view of the cable tie of FIG. 1, FIG. 3 is a bottom view of the cable tie of FIG. 1, FIG. 4 is a side view of the cable tie of FIG. 1, FIG. 5 is a longitudinal cross-sectional view of the cable tie of FIG. 1, FIG. 6 is a perspective view of the cable tie of FIG. 1 closed in a loop in the tying position, FIG. 7 is a longitudinal cross-sectional view of the cable tie of FIG. 6, FIG. 8 is a perspective view of the cable tie of FIG. 6 tying a plurality of cables and of which a portion of the material strip and the second end of the material strip have been cut off.

FIG. 14 represents a perspective view of a cable tie according to a fourth embodiment variant of the invention, FIG. 14A is a perspective view of detail A of FIG. 14 showing the fastening head of the cable tie, FIG. 15 is a longitudinal cross-sectional view of the cable tie of FIG. 14, FIG. 16 is a longitudinal cross-sectional view of the cable tie of FIG. 14 closed in a loop in the tying position, FIG. 17 is a perspective view of the cable tie of FIG. 14 closed in a loop in the tying position.

DETAILED DESCRIPTION OF THE PREFERRED EMBODIMENTS

Figure 9:
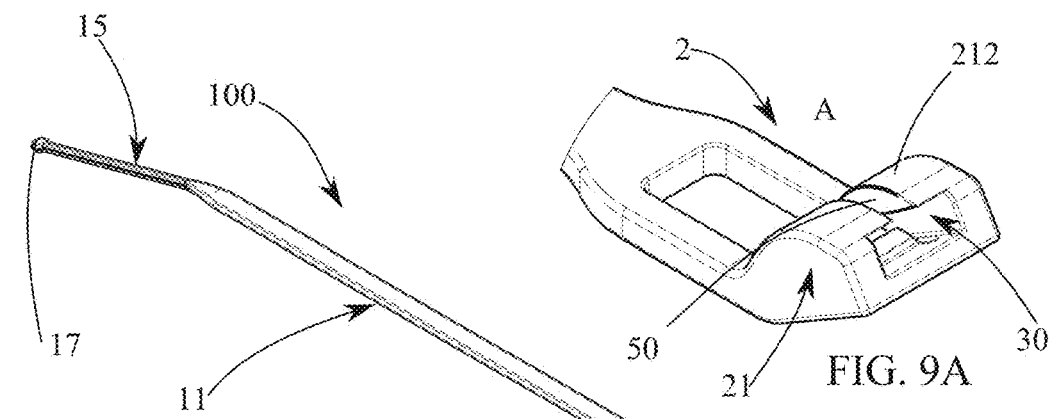
FIG. 9 represents a perspective view of a cable tie according to a second embodiment variant of the invention.
Figure 9A:
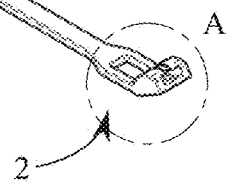
FIG. 9A is a perspective view of detail A of FIG. 9 showing the fastening head of the cable tie.

Referring to the figures, the invention relates to a cable tie 1, 100, 110, 120, 130 for tying an element or a plurality of elements together, and in particular cables C (FIG. 8). The cable ties 1, 100, 110, 120, 130 described are intended to be closed to form loops B in the tying position PS.

According to a first embodiment variant illustrated in FIGS. 1 to 8, cable tie 1 is an elongate element with a length L, which comprises a material strip 11 with a width la1, which is flexible and has a substantially flat shape, having a first side 12 comprising a notched section 122 provided with a plurality of teeth 123 arranged to cooperate with a ratchet 34 described below, and a substantially smooth second side 13 opposite to first side 12, without this example being restrictive. In fact, second side 13, which is opposite to first side 12, could also comprise a notched section provided with a plurality of teeth, arranged to cooperate with an additional ratchet, in compliance with the variant illustrated in FIGS. 18 to 21.

Cable tie 1 comprises at a first end 111 of material strip 11 a fastening head 2 and comprises at an opposite second end 112 of material strip 11 an insertion element 15 that is free and intended for being inserted in fastening head 2. Insertion element 15 comprises an inclined section 151 that is inclined by an obtuse angle A2 with respect to the longitudinal axis of material strip 11 and oriented towards first side 12 of material strip 11. The introduction of insertion element 15 in fastening head 2 is therefore facilitated. Insertion element 15 has preferably a width substantially equal to width la1 of material strip 11. It can however have a variable width, as explained below.

Cable tie 1 is preferably made out of a synthetic material such as polyamide or polyetheretherketone, given as non-exhaustive examples. The synthetic material is chosen preferably to withstand temperatures between −80° C. and 270° C. The synthetic material can also have, more specifically, high-temperature resistance properties according to the intended applications, and in particular between 80° C. and 270° C. Polyetheretherketone has the advantage to withstand up to a temperature substantially equal to 250° C. Of course, these examples are not restrictive.

As shown in FIGS. 1 to 3, fastening head 2 is connected to material strip 11 by a junction area 16 and has a width la2 that exceeds width la1 of material strip 11.

Fastening head 2, as it is illustrated in FIG. 1A, comprises a flat section 20 and a protruding section 21. Protruding section 21 is arranged at the free end of fastening head 2 and flat section 20 is arranged between junction area 16 and protruding portion 21.

More specifically and as illustrated in FIG. 4, flat section 20 of fastening head 2 is located in the plane of material strip 11. Conversely, protruding section 21 of fastening head 2 protrudes with respect to the longitudinal axis of material strip 11 towards second side 13. In fact, protruding section 21 is inclined by an acute angle A1 with respect to the longitudinal axis of material strip 11. From this results that the longitudinal axis of protruding section 21 is inclined by angle A1 with respect to the longitudinal axis of material strip 11. Protruding section 21 has a first external wall 211 oriented towards first side 12 and which is inclined according to angle A1 with respect to first side 12, and a second external wall 212 oriented towards second side 13. In the illustrated example, first side 211 has a flat shape, while second wall 212 has a rounded shape, without these shapes being restrictive. Junction 23 between flat section 20 and second external wall 212 of protruding portion 21 can, according to a non-represented variant, be reinforced by addition of material, so as to form one or several overthicknesses or reinforcing ribs. This is particularly advantageous to prevent fastening head 2 from bending, in particular when loop B of the cable tie is strongly reduced in the tying position PS. In fact, when a cable harness C has a reduced diameter, the loop B of cable tie 1 obtained has also a reduced diameter, which tends to bend junction 23. Adding material at junction 23 helps to avoid weakening of the fastening.

Protruding section 21 of fastening head 2 comprises a first through opening 30 that extends along the longitudinal axis of protruding section 21, as represented in particular in FIGS. 1A and 5. First opening 30 forms a guide channel that has an entry 31 through which insertion element 15 of cable tie 1 can be introduced and an exit 32 through which insertion element 15 of cable tie 1 can come out. Entry 31 is arranged at the free end of fastening head 2 and exit 32 ends towards flat section 20. First opening 30 has an internal wall 33 that is inclined according to the longitudinal axis of protruding wall 21 and that forms the guide channel to guide insertion element 15 of cable tie 1 towards a second opening 40 described below. Moreover, internal wall 33 comprises a ratchet 34 intended for cooperating with notched section 122 of first side 12 of material strip 11. More specifically, ratchet 34 is arranged on the side of first external wall 211. Moreover, ratchet 34 can be arranged on external wall 211 so as to leave at its free end a space 340 to introduce a tool that would allow lifting ratchet 34 up to release material strip 11, in order to facilitate loosening cable tie 1. This space 340 is accessible in the tying position PS from the outside of loop B.

As illustrated in particular in FIGS. 1 to 3, flat section 20 of fastening head 2 comprises a second opening 40 that passes through it transversally. From this results advantageously that exit 32 of first opening 30 ends in second opening 40, as shown in FIG. 5.

FIGS. 6 to 7 illustrate cable tie 1 according to the first embodiment variant that has been described, in the tying position PS. To pass from the initial position, in which cable tie 1 is open and described above to the tying position PS, in which cable tie 1 is closed in the form of a loop 13, one introduces insertion element 15 of cable tie 1 in fastening head 2. More specifically, insertion element 15 of cable tie 1 passes through first opening 30 from entry 31 towards exit 32, than it ends in second opening 40 and passes through it. One pulls insertion element 15 of cable tie 1 until ratchet 34 of first opening 30 engages notched section 122 of first side 12 of material strip 11. The movement of notched section 122 of material strip 11 with respect to first opening 30 thus can only take place in one direction, that is to say in the direction of the traction force exerted on insertion element 15 of cable tie 1, any movement in the opposite direction being therefore forbidden. Moreover, cable tie 1 forms a closed loop B whose notched section 122 of first side 12 is located outside of loop B at whose second side 13 is located inside of loop B. Advantageously, the arrangement of first side 12, which is notched, outside of loop B, prevents from marking the insulation of cables C when cables C are tied in loop B.

From this results that material strip 11 passes through first opening 30 of fastening head 2 from entry 31 towards exit 32, as well as through second opening 40 towards the outside of loop B. This is made possible by the shape of first opening 30, which is configured to guide naturally and automatically insertion element 15 of cable tie 1 towards second opening 40. In fact, the inclination of first opening 30 forms a guide channel for insertion element 15 of cable tie 1, or for a corresponding section of material strip 11. Preferably and as illustrated, the guide channel is a rectilinear channel. Moreover, exit 32 of this guide channel ends inside of loop B and towards or directly in second opening 40, so that insertion element 15 passes through this second opening 40 to reach the outside of loop B. First external wall 211 of protruding section 21 of fastening head 2 advantageously fits the shape of loop B. Second external wall 212 of protruding section 21 of fastening head 2 advantageously protrudes inside of loop B. From this results that the space requirement of fastening head 2 outside of loop B is reduced. The rounded shape of second external wall 212 also contributes to reduce space requirement inside of loop B and to prevent damaging cables C arranged inside of loop B. Consequently, only insertion element 15 of cable tie 1 and a part of material strip 11 protrude outside of loop B. They can however be cut off using a suitable tool, as illustrated in FIG. 8. In fact, insertion element 15 of cable tie 1 and a part of material strip 11 protruding outside of loop B can be cut off using a suitable tool so that the cut end 18 of material strip 11 obtained after cutting off is only housed in second opening 40 and does not protrude outside of loop B.

Figure 10:
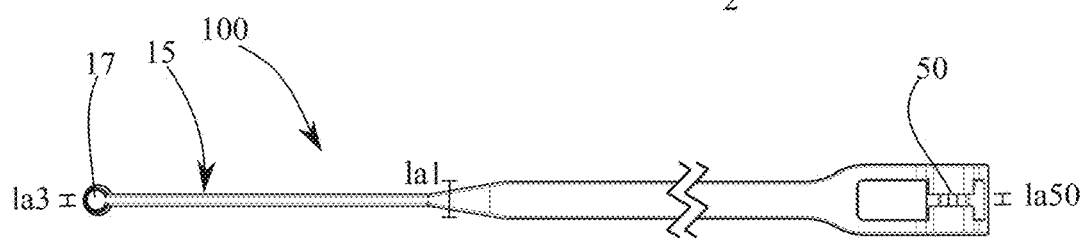
FIG. 10 is a top view of the cable tie of FIG. 9.
Figure 11:
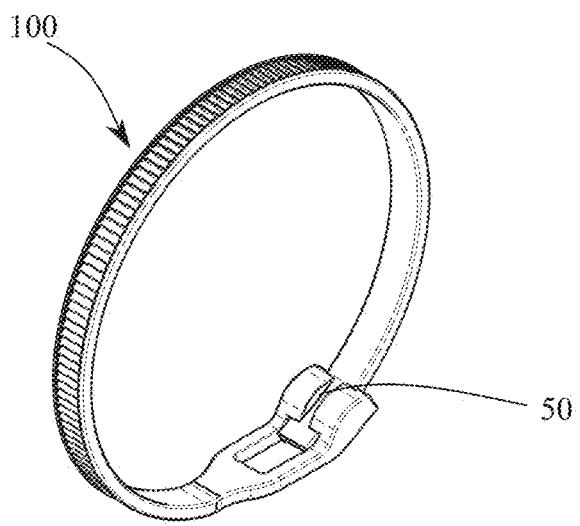
FIG. 11 is a perspective view of the cable tie of FIG. 9 closed in a loop in the tying position and of which a portion of the material strip and the second end of the material strip have been cut off.

According to a second variant of the invention illustrated in FIGS. 9 to 11, cable tie 100 differs from cable tie 1 described previously by the shape of protruding section 21 of fastening head 2 and by the shape of insertion element 15 of cable tie 100. In fact, protruding section 21 of fastening head 2 comprises a longitudinal slot 50 that extends on second external wall 212. Moreover, slot 50 is centered with respect to first opening 30 and extends along it and ends in it. Slot 50 has a width la50 that is smaller than the width of first opening 30. Moreover, insertion element 15 of cable tie 100 has a width la3 that is reduced with respect to width la1 of material strip 11 and ends with a gripping head 17. Width la50 of slot 50 is slightly larger than width la3 of insertion element 15 of cable tie 100. This configuration allows introducing insertion element 15 of cable clamp 100 in fastening head 2 through slot 50. Introducing insertion element 15 of cable tie 100 in fastening head 2 is faster and easier than in the previously described first embodiment variant.

Figure 12:
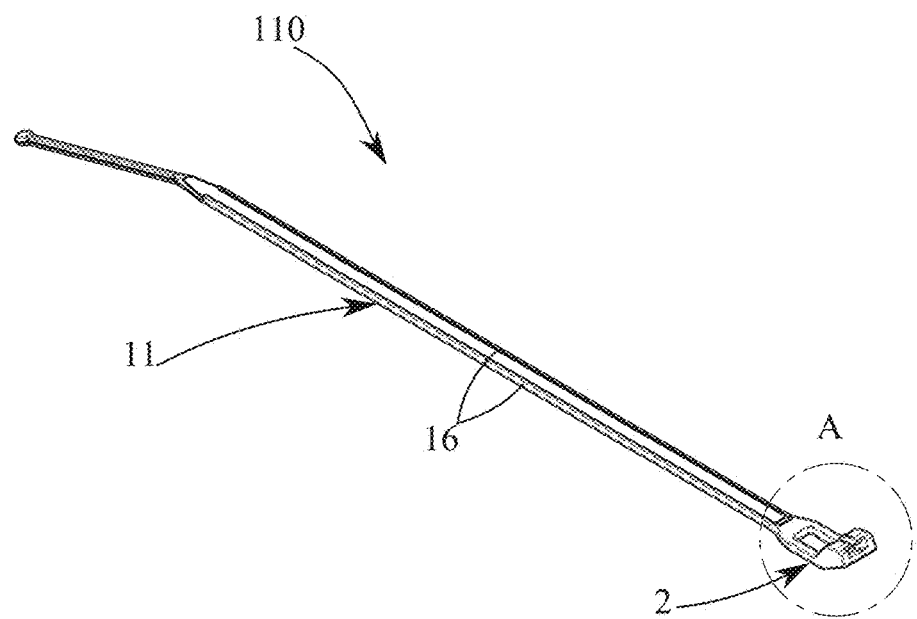
FIG. 12 represents a perspective view of a cable tie according to a third embodiment variant of the invention.
Figure 12A:
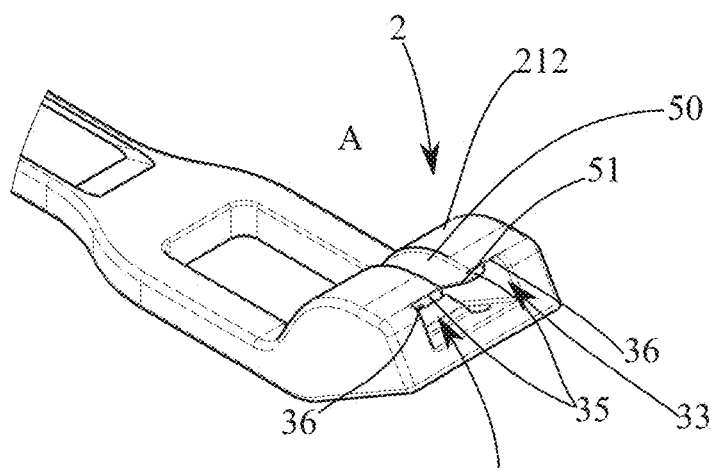
FIG. 12A is a perspective view of detail A of FIG. 12 showing the fastening head of the cable tie.
Figure 13:
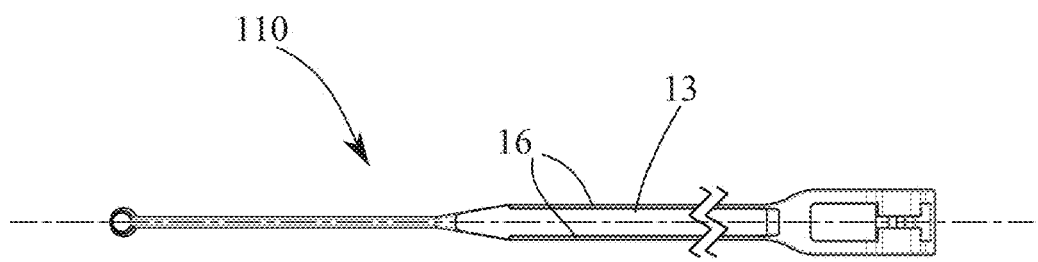
FIG. 13 is a top view of the cable tie of FIG. 12.
Figure 18:
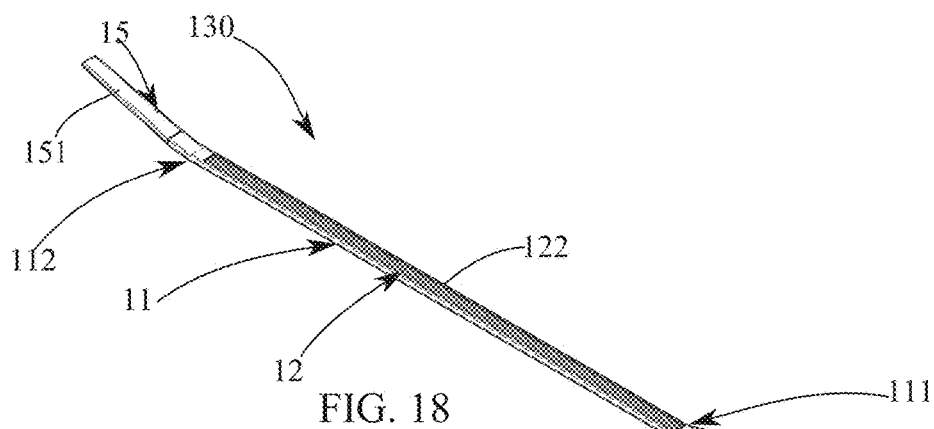
FIG. 18 represents a perspective view of a cable tie according to a fifth embodiment variant of the invention.
Figure 19:
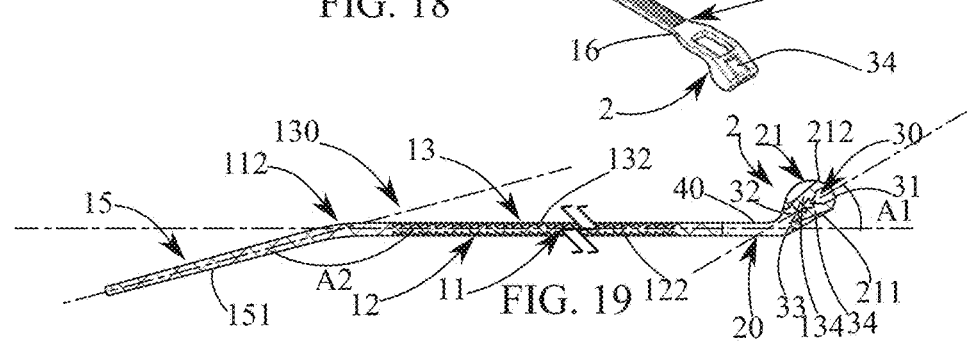
FIG. 19 is a longitudinal cross-sectional view of the cable tie of FIG. 18.
Figure 20:
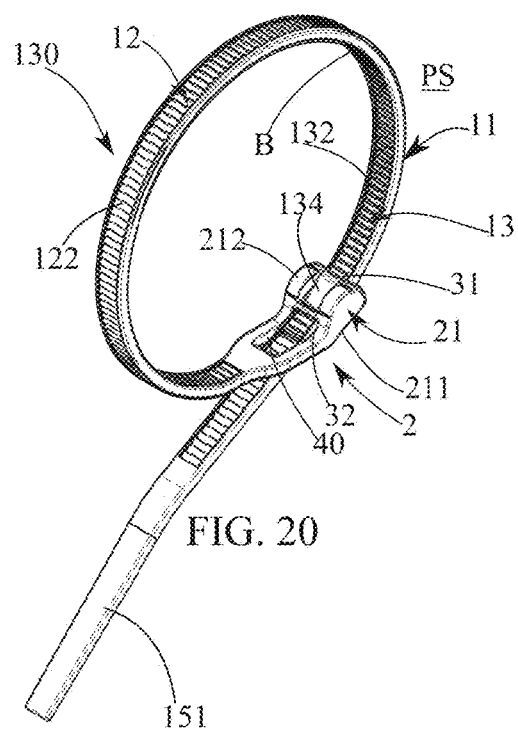
FIG. 20 is a perspective view of the cable tie of FIG. 18 closed in a loop in the tying position.
Figure 21:
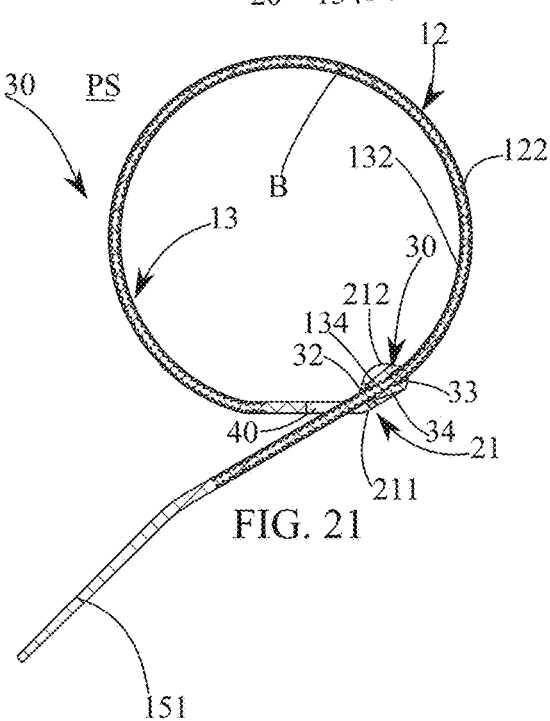
FIG. 21 is a longitudinal cross-sectional view of the cable tie of FIG. 20.

According to a third variant of the invention illustrated in FIGS. 12 to 13, cable tie 110 differs from cable tie 100 described previously by the shape of first opening 30 and by the shape of material strip 11. Second side 13 of material strip 11 comprises two lips 16 that extend along the edges of material strip 11. Moreover, as illustrated in FIG. 12A, first opening 30 is provided on internal wall 33, on the side of second external wall 212, with two overthicknesses 35 arranged at the outlet 51 of slot 50. The two overthicknesses 35 delimit, with internal wall 33, two parallel internal grooves 36, wherein lips 16 of material strip 11 can be introduced and slide. This configuration allows reinforcing the lateral strength of fastening head 2. According to a non-represented variant, second side 13 of material strip 11 can also comprise, in addition to the two lips 16, a contact tongue centered on second side 13. This contact tongue allows advantageously to increase the contact surface on the cables and to reduce the penetration effect of cable tie 110 in the insulation of the cables.

According to a fourth variant of the invention illustrated in FIGS. 14 to 17, cable tie 120 differs from cable tie 1 according to the previously described first variant by the relative position of protruding section 21 of fastening head 2 with respect to first side 12, which is notched, and to second side 13, which is smooth, of material strip 11. In fact, protruding section 21 of fastening head 2 protrudes with respect to the longitudinal axis of material strip 11 towards first side 12 and not towards second side 13, as is the case in the first variant (see FIGS. 1 to 8) and is inclined by an acute angle A1 with respect to the longitudinal axis of material strip 11, as shown in FIG. 15. Protruding section 21 has a first external wall 211 oriented towards second side 13 and which is inclined according to angle A1 with respect to second side 13, and a second external wall 212 oriented towards first side 12. Moreover, in this fourth variant, ratchet 34 is arranged on internal wall 33 on the side of second external wall 212. In the illustrated example, first side 211 has a flat shape, while second external wall 212 has a rounded shape, without these shapes being restrictive. From this results, in the tying position PS, that cable tie 120 forms a closed loop B whose first side 12 is located inside of loop B and whose second side 13 is located outside of loop 13. Unlike in the first embodiment variant, notched section 122 of first side 12 is located outside of loop B and second side 13 is located inside of loop B. Advantageously and in compliance with this fourth embodiment variant, the arrangement of smooth second side 13 outside of loop B makes cleaning cable tie 120 easier and avoids the creation of catch-on areas.

According to a fifth variant represented in FIGS. 18 to 21, cable tie 130 differs from the first variant in that second side 13 also comprises a notched section 132. From this results that first side 12 and second side 13 of material strip 11 are notched. Moreover, fastening head 2 comprises two ratchets 34, 134, a first ratchet 34 intended for cooperating with notched section 122 of first side 12 and a second ratchet 134 intended for cooperating with notched section 132 of second side 13. In this case first ratchet 34 is arranged on internal side 33, on the side of first external wall 211, and second ratchet 134 is arranged on internal wall 33, on the side of second external wall 212. First ratchet 34 and second ratchet 134 are arranged in front of each other. Advantageously, the fact that first side 12 and second side 13 each comprise a notched section 122 and 132 and that fastening head 2 is provided with two ratchets 34 and 134 allows increasing the fastening strength. This results in improved fastening strength in the tying position. Moreover, this embodiment allows providing notched sections 122, 132 having teeth whose depth is smaller with respect to that of the variants provided with one single ratchet.

According to a non-represented variant, the insertion element of the cable tie according to the second and third variants can have a variable width. The insertion element can for example comprise a first section with a width smaller than the width of the material strip and a second extremal section whose width is substantially equal to the width of the material strip. This variant allows placing the cable tie in pre-assembly position by introducing the second extremal section in the fastening head without locking the cable tie. In this position, the cable tie forms a loop that is not locked, as the ratchet is not engaged in the notched section. This functionality advantageously allows reopening the loop, for example for adding cables before the definitive locking of the cable tie.

This description shows clearly that the invention allows reaching the goals defined, that is to say reduce the space requirement of fastening head 2 of a cable tie 1, 100, 110, 120, 130 and eliminate any protrusion of protruding ends outside of loop B.

The present invention will in particular be used for tying elongate elements such as cables C as shown especially in FIG. 8.

The present invention is not restricted to the examples of embodiment described, but extends to any modification and variant which is obvious to a person skilled in the art.

The invention claimed is:

1. A cable tie (1, 100, 110, 120, 130) comprising:
   an elongate flexible material strip (11) provided with a first side (12) and a second side (13) which are opposite one another,
   the first side (12) comprising a notched section (122),
   the cable tie (1, 100, 110, 120, 130) comprising, at a first end (111) of the material strip (11), a fastening head (2) comprising a first opening (30) provided with a ratchet (34) and which protrudes with respect to a longitudinal axis of material strip (11), and an insertion element (15), at a second end (112) of the material strip (11), that is free and arranged to be introduced in the fastening head (2),
   the first opening (30) forming a rectilinear guide channel which passes longitudinally through the fastening head (2), between an entry (31) ending at a free end of the fastening head (2) and an exit (32) ending towards a junction area (16) between the material strip (11) and the fastening head (2), in a tying position (PS) of the cable tie (1, 100, 110, 120, 130), the material strip (11) passes through the first opening (30) of the fastening head (2) from the entry (31) towards the exit (32) so that the material strip (11) forms a closed loop (B), the notched section (122) of the first side (12) of the material strip (11) cooperates with the ratchet (34) of the fastening head (2) to allow movement of the notched section (122), with respect to the first opening (30), in a single direction and prevent movement of the notched section (122) in an opposite direction, the fastening head (2) comprising a second opening (40), that passes transversely through the fastening head (2), arranged between the junction area (16) and the first opening (30) so that, in the tying position (PS) of the cable tie (1, 100, 110, 120, 130), the exit (32) of the first opening (30) ends inside of the loop (B) formed by the cable tie and towards the second opening (40), the fastening head (2) comprising a section (21) protruding with respect to the longitudinal axis of material strip (11), oriented toward one of the first or the second sides (12, 13) of the material strip (11), and in which the first opening (30) is arranged, and the protruding section (21) forming an acute angle (A1) with respect to the longitudinal axis of the material strip (11), and the first opening (30) comprising a peripheral internal wall (33) also having the same acute angle (A1) so that a central axis of the rectilinear guide channel extends parallel to the acute angle (A1) and passes through the second opening (40) for guiding the material strip (11) through the second opening (40) towards an outside of the loop (B) in the tying position (PS) of the cable tie (1, 100, 110, 120, 130).

2. The cable tie according to claim 1, wherein the exit (32) of the first opening (30) ends in the second opening (40).

3. The cable tie according to claim 1, wherein the protruding section (21) of the fastening head (2) comprises a first inclined external wall (211) located on a side of one of the first or the second sides (12, 13), and, in the tying position (PS), the first external wall (211) is located outside of the loop (B) and substantially fits the shape of the loop (B).

4. The cable tie according to claim 3, wherein the protruding section (21) of the fastening head (2) comprises a second external wall (212) located opposite to the first external wall (211), oriented towards the other of the first and the second sides (12, 13) of the material strip (11), and, in the tying position (PS), the second external wall (212) protrudes inside of the loop (B).

5. The cable tie according to claim 3, wherein the ratchet (34) is arranged on the side of the first external wall (211) of the protruding section (21), the protruding section (21) of the fastening head (2) comprises a longitudinal slot (50) that extends on a second external wall (212), is centered with respect to the first opening (30), opens the first opening (30) longitudinally and ends with an outlet (51) in the first opening (30), and the insertion element (15) has a reduced width (la3) with respect to a width (la1) of the material strip (11), the width (la3) of the insertion element (15) being smaller than or equal to a width (la50) of the slot (50) to allow introduction of the fastening head (2) through the slot (50) in the first opening (30).

6. The cable tie according to claim 5, wherein the first opening (30) is provided, on the internal wall (33), with two overthicknesses (35) located on either side of the outlet (51) of the slot (50) and forming two grooves (36).

7. The cable tie according to claim 6, wherein the material strip (11) comprises two lips (16) that extend along the edges of the material strip (11) to cooperate with the two grooves (36) of the first opening (30) in the tying position (PS).

8. The cable tie according to claim 3, wherein the ratchet (34) is arranged on the side of first external wall (211) of the protruding section (21) so as to provide an insertion space (340), at a free end of the ratchet (34), allowing dismounting the cable tie (1, 100, 110).

9. The cable tie according to claim 1, wherein the internal wall (33) of the first opening (30) comprises the ratchet (34).

10. The cable tie according to claim 1, wherein the fastening head (2) comprises a flat section (20), located between the junction area (16) and the protruding section (21), in a plane of the material strip (11) in which the second opening (40) is arranged.

11. The cable tie according to claim 1, wherein the insertion element (15) comprises an inclined section (151), which is inclined by an obtuse angle (A2) with respect to the longitudinal axis of the material strip (11) and oriented towards the first side (12) or the second side (13), opposite to the first side (12), of the material strip (11).

12. The cable tie according to claim 1, wherein the second side (13) of the material strip (11) has a flat face.

13. The cable tie according to claim 1, wherein the second side (13) of the material strip (11) comprises a notched section (132) arranged to cooperate with a second ratchet (134) arranged on the internal wall (33) of the first opening (30) adjacent the first ratchet (34).

14. The cable tie according to claim 1, wherein, in the tying position (PS), a cut end (18) of the material strip (11), obtained after cutting, is housed in the second opening (40) so as not to protrude outside of the loop (B).

* * * * *